Oct. 3, 1950     L. S. PELFREY     2,524,270
SELENIUM RECTIFIER
Filed Sept. 27, 1945
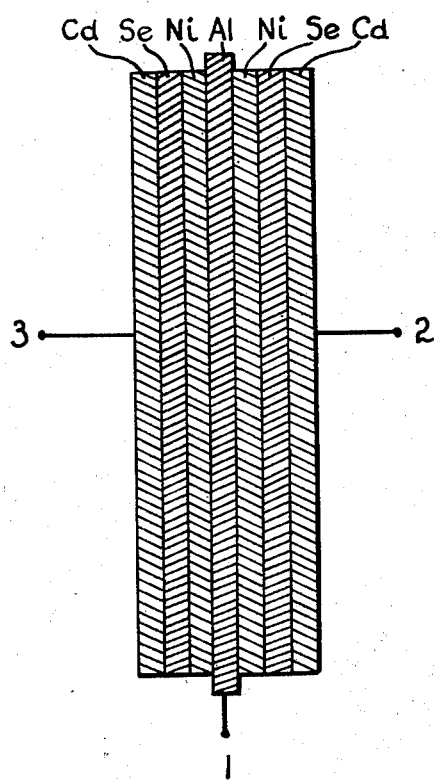
INVENTOR.
Lowell S. Pelfrey
BY
Lawrence Burns,
ATTORNEY Patented Oct. 3, 1950

2,524,270

UNITED STATES PATENT OFFICE 2,524,270

SELENIUM RECTIFIER

Lowell S. Pelfrey, Hamilton, Mass., assignor to Sylvania Electric Products Inc., Salem, Mass., a corporation of Massachusetts Application September 27, 1945, Serial No. 618,957

3 Claims. (Cl. 175—366)

This invention relates to electrical rectifiers, and particularly to selenium rectifiers.

An object of the invention is to produce a rectifier which is inexpensive, has a high "stand off" voltage, and may directly form a full wave unit.

Features of the invention are a layer of cadmium over a layer of selenium, and a nickel-plated piece of aluminum or other suitable metal on which the selenium is deposited. An additional feature is using a middle aluminum plate with the required layers on both sides of it to form a full wave rectifier unit.

The drawing illustrates a cross section of a rectifier embodying the invention.

In the figure, a central layer of aluminum is plated on both sides with nickel, which may actually alloy with the aluminum, and which prevents oxidation of the latter. The nickel-plated piece may be dipped in selenium to acquire a coating of it. A metal layer or counter-electrode, for example cadmium may then be deposited over the selenium, preferably by being sprayed thereupon. The unit is then baked at about 210° C., and preferably between 200° C. and 210° C. to keep below the melting point of the selenium. This forms a barrier layer between the selenium and cadmium, and in any event makes the device rectify.

Although my device may be used as a half wave rectifier, I prefer to deposit the series of layers on both sides of the aluminum plate as shown in the drawing to make a full wave rectifying unit, one connection 1 to the usual full wave circuit being made from the aluminum piece and the other two connections 2, 3 being made from the cadmium layers. The two outside cadmium plates may be connected together, placing the two rectifying sections in parallel for greater current carrying capacity. To do this, connection may be made between 2 and 3.

Before depositing the selenium on the nickel, I fire the nickel in hydrogen. Aluminum is a good base material for the nickel plate because it is a good electrical and heat conductor, but other metals having similar properties, for example, steel, may also be used.

My completed unit will withstand a "back" voltage, that is a voltage in the non-current-passing direction, as high as 20 volts. This high "stand-off" voltage reduces the number of units necessary to be used in series to rectify high voltages. A series "stack" of only five half wave units would rectify 100 volts. My invention, by reducing the number of units necessary for a given voltage, facilitates cooling of the unit.

What I claim is:

1. The method of making a selenium rectifier which comprises plating a metal with nickel, hydrogen-firing the nickel coating, coating the nickel with selenium, coating the selenium with cadmium, and baking the resultant unit at about 210° C.

2. A rectifier comprising a metal plate, a hydrogen-fired coating of nickel thereon, a coating of selenium over the nickel, and a cadmium counter-electrode over the selenium, the physical state of the unit and especially the selenium and the counter-electrode having the characteristics produced by baking the unit at about 210° C.

3. The method of making a selenium rectifier which comprises plating metal with nickel, hydrogen-firing the nickel coating, then applying a film of selenium in liquid state to the nickel, next applying a cadmium counter-electrode to the selenium, and baking the resultant unit at about 210° C.

LOWELL S. PELFREY.

REFERENCES CITED

The following references are of record in the file of this patent:

UNITED STATES PATENTS

| Number | Name | Date |
| --- | --- | --- |
| 1,826,955 | Ruben | Oct. 13, 1931 |
| 2,109,879 | De Boer et al. | Mar. 1, 1938 |
| 2,121,603 | Lotz | June 21, 1938 |
| 2,124,306 | Osawa | July 19, 1938 |
| 2,157,895 | Hein | May 9, 1939 |
| 2,356,094 | Saslaw | Aug. 15, 1944 |
| 2,367,943 | Hein | Jan. 23, 1945 |